(12) United States Patent
Jannetides

(10) Patent No.: US 7,568,774 B1
(45) Date of Patent: Aug. 4, 2009

(54) KEYBOARD DRAWER WITH SELF-RETRACTING MOUSE PLATFORM

(75) Inventor: James N. Jannetides, Fishers, IN (US)

(73) Assignee: J Squared, Inc., Greenfield, IN (US)

( * ) Notice: Subject to any disclaimer, the term of this patent is extended or adjusted under 35 U.S.C. 154(b) by 141 days.

(21) Appl. No.: 11/244,940

(22) Filed: Oct. 6, 2005

(51) Int. Cl.
*A47B 81/00* (2006.01)

(52) U.S. Cl. ............... 312/223.3; 312/208.1; 248/918; 108/94

(58) Field of Classification Search ............... 312/223.3, 312/208.1, 194, 195, 302; 108/50.01, 50.02, 108/137, 142, 94, 102, 103, 139, 140, 143; 52/36.1; 248/118.1, 118.3, 289.11, 282.1, 248/918, 346.01
See application file for complete search history.

(56) References Cited

U.S. PATENT DOCUMENTS

| | | | | |
|---|---|---|---|---|
| 2,037,919 A * | 4/1936 | Poe | ............... | 108/93 |
| 4,709,972 A * | 12/1987 | LaBudde et al. | ......... | 312/208.3 |
| 5,667,320 A * | 9/1997 | Ambrose et al. | ............ | 400/472 |
| 5,771,814 A * | 6/1998 | Clausen | ........................ | 108/93 |
| 5,832,840 A * | 11/1998 | Woof | ............................. | 108/6 |
| 5,924,807 A | 7/1999 | Ambrose et al. | | |
| 5,931,103 A * | 8/1999 | Huang | ...................... | 108/50.02 |
| 6,105,508 A * | 8/2000 | Ryburg | ......................... | 108/42 |
| 6,152,411 A * | 11/2000 | Lundstrom | ............... | 248/291.1 |
| 6,296,215 B1 * | 10/2001 | McCoy et al. | ............ | 248/284.1 |
| D455,756 S | 4/2002 | Tonizzo et al. | | |
| 6,454,064 B1 * | 9/2002 | Cheng | .......................... | 190/11 |
| 6,505,566 B1 * | 1/2003 | Foster et al. | ................ | 108/138 |
| 6,659,416 B2 * | 12/2003 | Hicks et al. | ............ | 248/346.11 |
| 6,682,038 B2 * | 1/2004 | Golynsky | .............. | 248/346.01 |
| 6,688,563 B1 * | 2/2004 | Waxham et al. | .......... | 248/118.1 |
| 6,745,897 B2 | 6/2004 | Barber | | |
| 6,912,119 B2 | 6/2005 | Maloney | | |
| 2002/0166927 A1 * | 11/2002 | Kollar | ..................... | 248/118.1 |
| 2004/0251152 A1 * | 12/2004 | Levin | ......................... | 206/320 |
| 2005/0211863 A1 * | 9/2005 | Masi | ........................ | 248/442.2 |

* cited by examiner

*Primary Examiner*—Janet M Wilkens
(74) *Attorney, Agent, or Firm*—William F. Bahret

(57) ABSTRACT

A keyboard drawer with self-retracting mouse platform beneath the desktop of a desk is slidably engaged between first and second parallel vertical members extending downward from the desktop. The mouse platform is pivotally connected atop a sidewall of the keyboard drawer such that one of the vertical members provides a pivot point for pivoting the mouse platform from an extended position, in front of the vertical member, to a retracted position, over the keyboard drawer. The mouse platform is pivoted when it contacts the pivot point during movement of the keyboard drawer from an open position in front of the desktop to a closed position beneath the desktop.

11 Claims, 4 Drawing Sheets

KEYBOARD DRAWER WITH SELF-RETRACTING MOUSE PLATFORM

BACKGROUND OF THE INVENTION

This invention relates to drawers mounted beneath a desk or table top and, more particularly, keyboard drawers and mouse platforms, typically for use with computer work areas.

Keyboard drawers and trays are typically attached beneath desktops and tabletops by sliding mechanisms that allow them to slide out from underneath the desktop for keyboard access and slide beneath the desktop to stow the keyboards out of the way when not needed. Some provide one common surface that may hold a pointing device, such as a computer mouse, adjacent the keyboard, while others provide a separate tray or platform positioned to one side. Those keyboard drawers and trays that have separate mouse platforms typically provide various ways of stowing them out of the way when not in use. Some mouse platforms are entirely manually operated, while others are automatically operated.

SUMMARY OF THE INVENTION

One aspect of the invention involves a desk having a desktop, a first vertical support member extending downward from the desktop and a sliding drawer mounted below the desktop that has one side adjacent the first vertical support member. A mouse platform is pivotally connected to the side of the drawer and extendable therefrom into a position in front of the vertical support member when the drawer is open. The mouse platform has a retracted position adjacent the vertical support member where the mouse platform automatically pivots into the retracted position in response to contact with the vertical support member as the drawer is closed.

Another aspect of the invention involves a desk having a desktop and first and second parallel vertical members extending downward from the desktop. A keyboard drawer is slidably engaged between the first and second vertical members. The keyboard drawer has a bottom, a sidewall positioned adjacent the first vertical member, and a hinge-mounted front wall having height greater than the sidewall relative to the bottom, providing a clearance pocket between the desktop and the sidewall. A mouse platform is pivotally connected horizontally atop the sidewall of the drawer within the clearance pocket. The mouse platform is extendable into a position in front of one of the first and second parallel vertical members when the keyboard drawer is open and has a retracted position adjacent said vertical member, where the mouse platform pivots into the retracted position in response to contact with the vertical support member as the keyboard drawer is closed.

A further aspect of the invention involves a method of mounting a keyboard drawer with a pivotally mounted mouse platform in a desk to provide a self-retracting mouse platform. A desk with a desktop, a vertical member extending downward therefrom, and a keyboard drawer having a pivotally mounted horizontal mouse platform is provided. The keyboard drawer with pivotally mounted horizontal mouse platform is mounted beneath the desktop of the desk such that the vertical member provides a contact point for the mouse platform to contact when the drawer is moved from an open position to a closed position. The contact pivots the mouse platform from an extended position in front of the vertical member into a retracted position adjacent the vertical member.

Another aspect of the invention involves a method of attaching a self-retracting mouse platform to a keyboard drawer that is slidably mounted beneath a desktop of a desk to a vertical member extending downward from the desktop. The keyboard drawer has a bottom and a sidewall connected adjacent the vertical member. A provided mouse platform is pivotally mounted atop the sidewall of the keyboard drawer such that the vertical member provides a contact point for pivoting the mouse platform from an extended position in front of the vertical member to a retracted position over the bottom of the keyboard drawer when the mouse platform contacts the contact point during movement of the keyboard drawer from an open position to a closed position.

The objects and advantages of the present invention will be more apparent upon reading the following detailed description in conjunction with the accompanying drawings.

DETAILED DESCRIPTION OF THE PREFERRED EMBODIMENTS

Figure 1:
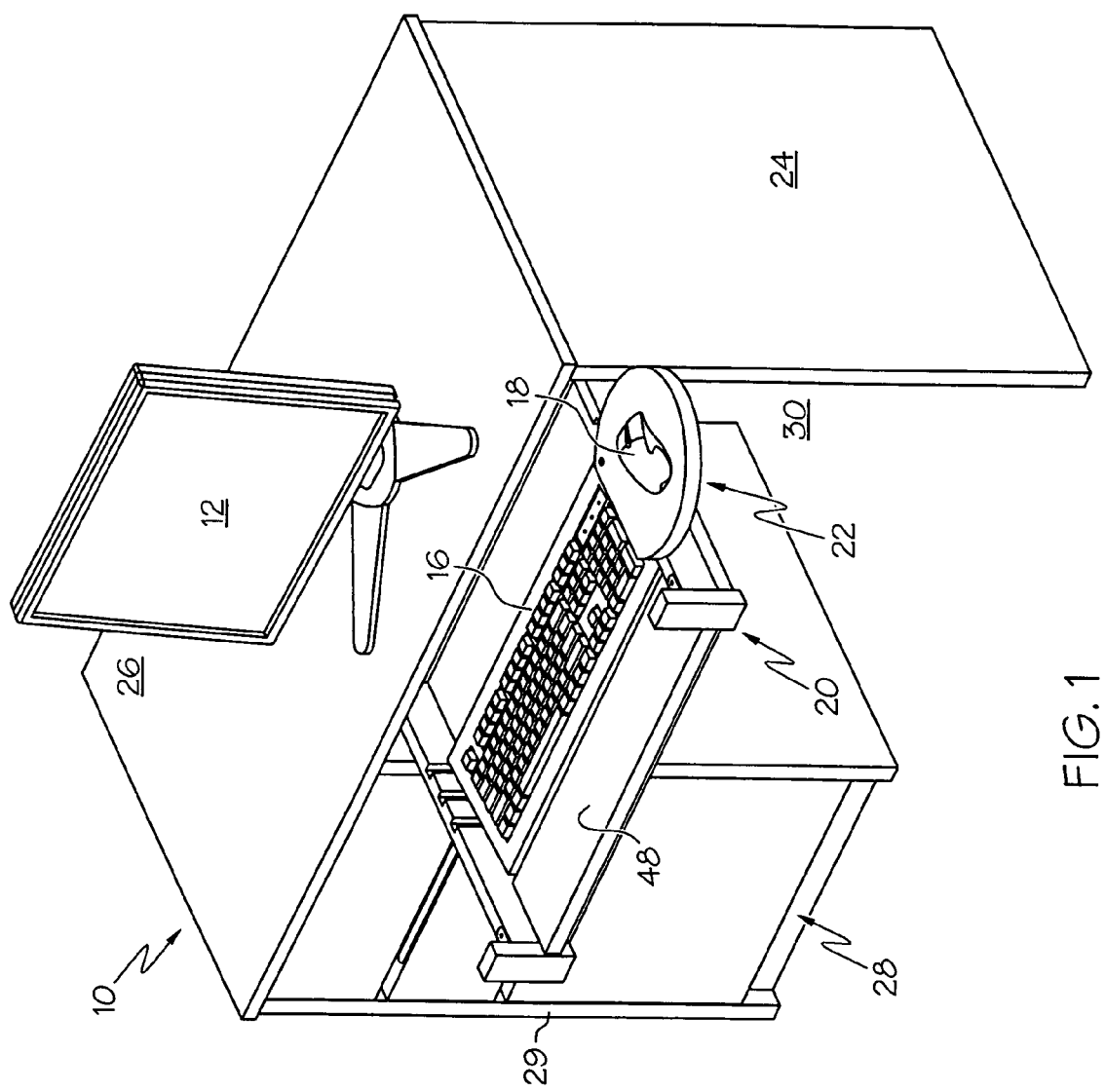
FIG. 1 is a perspective view of a desk including one embodiment of a keyboard drawer with self-retracting mouse platform according to the present invention while in use.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Desks, tables, countertops and other work surfaces, hereinafter collectively referred to as desks, are commonly used to hold desktop computers with their associated computer monitors typically being placed on the desktop and their computer keyboards and computer mice being held in a tray or drawer beneath the desktop. The desk 10 shown in FIG. 1 holds a desktop computer monitor 12 and utilizes a keyboard drawer with self-retracting mouse platform according to the present invention to hold the computer keyboard 16 and computer mouse 18. The desk 10, keyboard drawer 20 and mouse platform 22 shown in FIG. 1 are made of wood, but may be made of other materials such as metal or plastic.

Desks typically have one or more vertically oriented support members connected to the bottom of the desktop, such as the sidewall of a drawer or inner surface of a desk leg, adjacent a seating area intended for use as leg clearance for a person sitting at the desk. The desk 10 shown in FIG. 1 has a desk leg 24 connected to the bottom of the desktop 26 at the right edge and a stack of drawers 28 and desk leg 29 at the left side, defining the seating area 30. A sliding component 32, such as a slide track 34 with stationary roller 36, as shown in FIGS. 2 and 3 only on the inner surface 38 of leg 24 for illustrative purposes, is secured to the inner surface 38 of leg 24 and inner surface 40 of the stack of drawers 28 to receive the keyboard drawer 20 with self-retracting mouse platform 22, above the seating area 30.

The keyboard drawer 20 generally has a bottom 42 with stationary sidewalls 44, 46 and a movable front wall 48 hingedly connected to the front of the bottom 42 to allow user access to the keyboard 16 held in the drawer 20. The keyboard drawer is mounted beneath the desktop 26 such that the taller front wall 48 hangs closely adjacent the bottom of the desktop 26, creating a clearance pocket between the top of sidewalls 44, 46 and the bottom of desktop 26 for mouse platform 22 to occupy. The outer surface of each sidewall 49, 50 has a sliding component 52, such as slide track 54 and roller 56, as shown in FIGS. 2 and 3 only on the outer surface 50 of sidewall 46 for illustrative purposes, adapted for engagement with the sliding components 32 of the desk 10 so that the drawer 20 may be moved from a retracted, closed position underneath the desktop 26, to an extended, open position where a majority of the drawer 20 extends out from underneath the desktop 26, in front of the desk 10. The top surface of each sidewall 58, 60 has a metal insert 62 for receiving the screw fastener 64 that pivotally secures the mouse platform 22 atop the sidewall 44.

Figure 2:
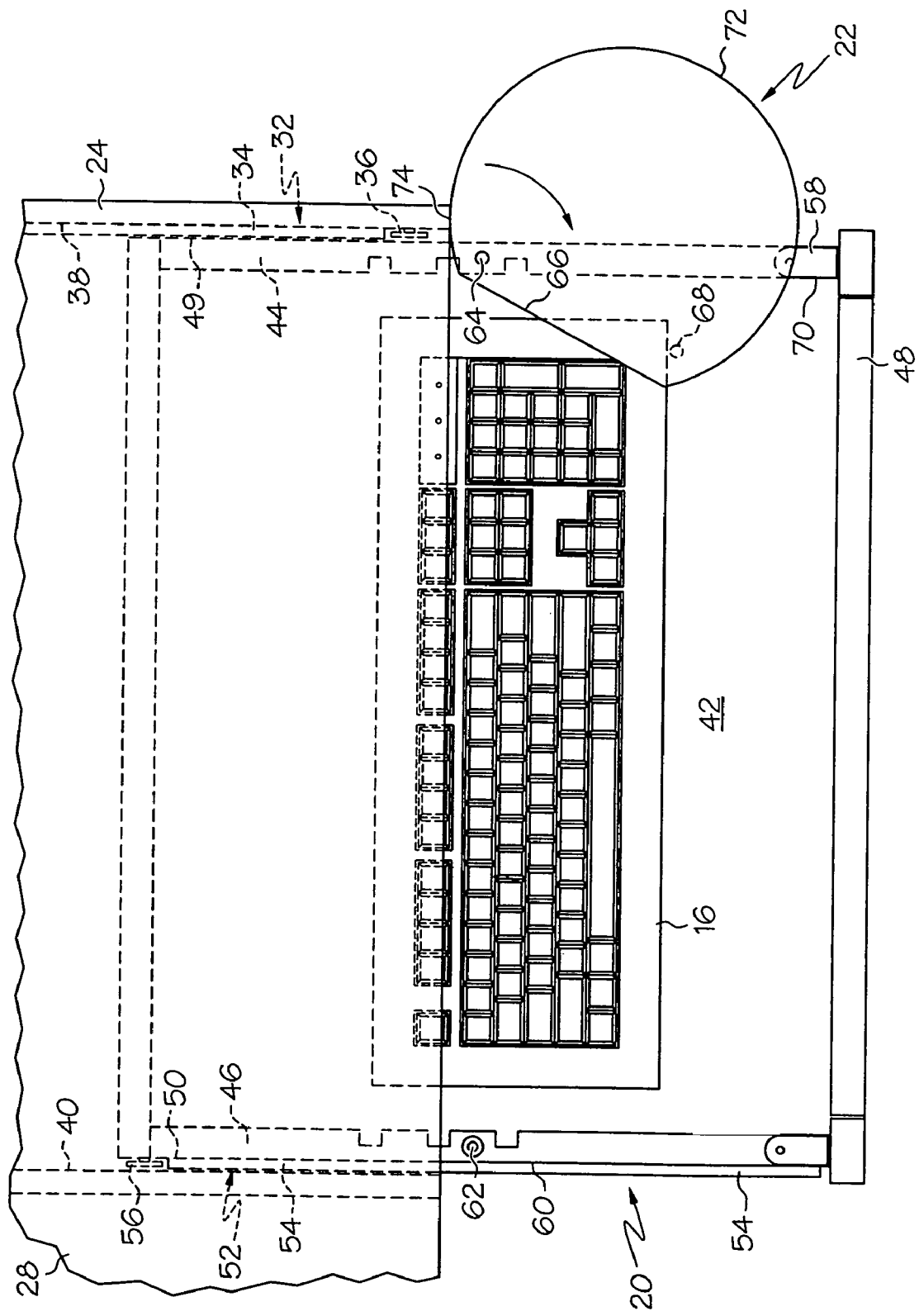
FIG. 2 is a plan view of the desk of FIG. 1 during closure of the keyboard drawer with self-retracting mouse platform.
Figure 3:
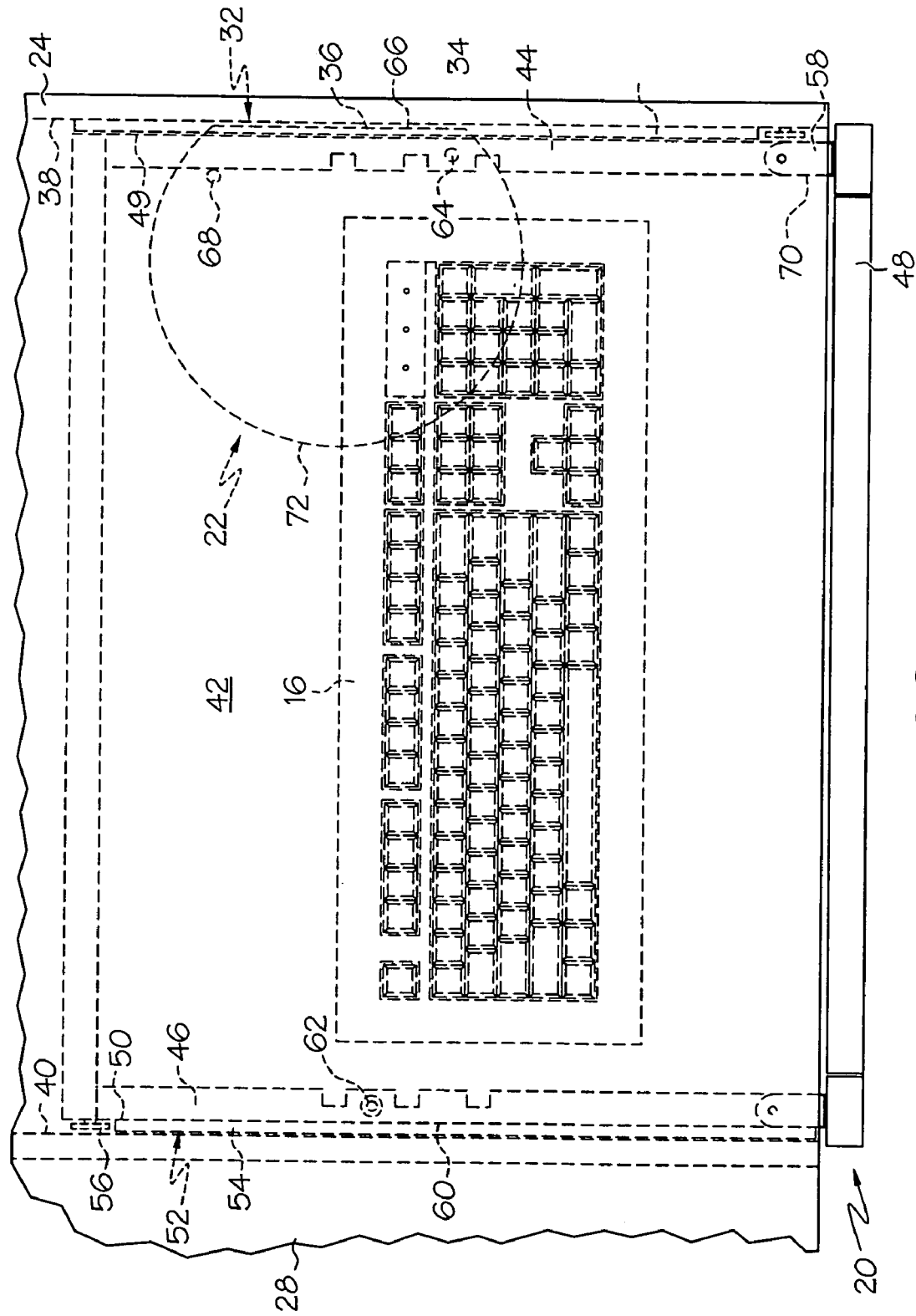
FIG. 3 is a plan view of the desk of FIG. 1 with the keyboard drawer with self-retracting mouse platform in a fully retracted position.
Figure 4:
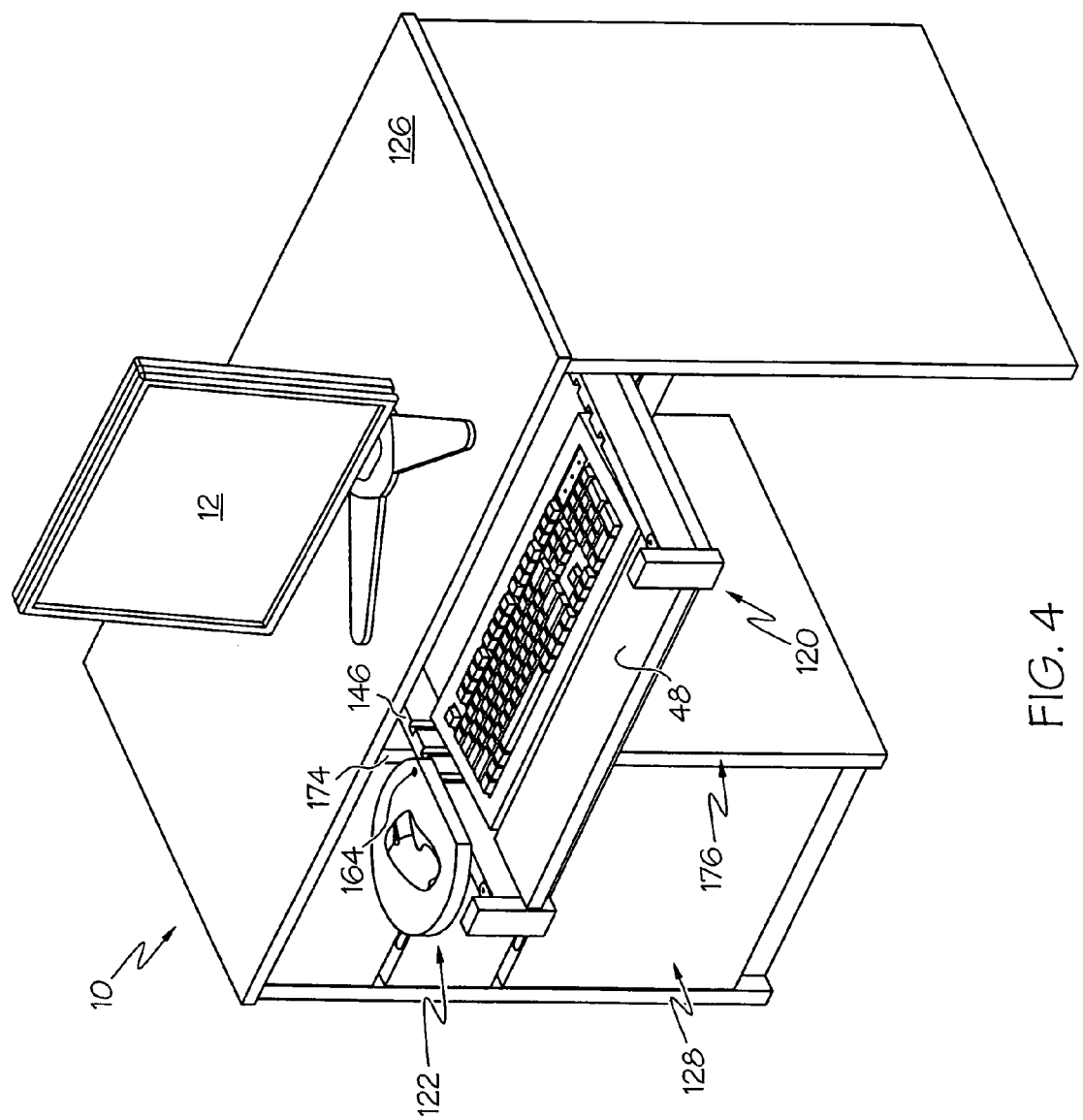
FIG. 4 is a plan view of a desk including another embodiment of a keyboard drawer with self-retracting mouse platform.

The mouse platform 22 shown in FIGS. 1-3 is pivotally connected to the top surface 58 of the right drawer sidewall 44 with screw fastener 64, so that the platform pivots above keyboard 16 during extension and retraction. The mouse platform may also be attached to the left sidewall 46 by way of a screw fastener secured into metal insert 62 as shown in FIG. 4, if desired for left-handed users. Alternatively, the mouse platform may be connected to the bottom of the keyboard drawer or mounted within an opening in the sidewall of the drawer such that the platform would horizontally pivot through the sidewall. The mouse platform 22 is preferably sized to provide suitable area in which to manipulate a computer mouse during use as a computer pointing device, such as within the range of 42 to 56 in.$^2$, for example. The mouse platform 22 shown in FIGS. 1-3 has a straight inner edge 66 that is designed to align generally parallel with the drawer sidewall 44 when the platform 22 is rotated outwardly and the platform stop 68 contacts the inner surface 70 of the sidewall 44. This allows for unobstructed access to the computer keyboard 16 during use. The outer edge 72 of the mouse platform 22 is preferably arcuately shaped to facilitate retraction of the platform 22, as will be described hereinafter. The mouse platform 22 shown in FIGS. 1-3 has a generally circular outer edge 72, but may be of a different general shape, such as elliptical, for example.

When access to the computer keyboard 16 and mouse 18 are desired, the keyboard drawer 20 may be pulled from a retracted position beneath the desktop 26 to an extended position, in front of the desktop 26. The front wall 48 of the drawer 20 may then be rotated downwardly on its hinge, to gain access to the keyboard 16. The mouse platform 22 may then be manually rotated about the screw fastener 64 from a retracted position overlying the keyboard drawer bottom 42, to an extended position adjacent the keyboard drawer 20 as shown in FIG. 1. The platform stop 68 limits extension of the mouse platform 22. A computer mouse 18 may then be placed upon the mouse platform 22 for use. Alternatively, the pivotal connection may be spring-loaded so that the mouse platform 22 may automatically pivot to an extended position once platform 22 clears end face 74 of desk leg 24. For example, a torsion spring may be positioned about screw fastener 64 with one end held stationary within sidewall 44 and the other end held within a slot on the bottom of platform 22 such that the torsion spring would urge the platform to an extended position.

When it is desired to stow the computer keyboard 16 and mouse 18 out of the way of the desktop 26, the computer mouse 18 may be removed from the mouse platform 22 and placed in the keyboard drawer 20 and the front wall 48 of the keyboard drawer 20 may be rotated closed. The keyboard drawer 20 may then be pushed from an extended open position to a retracted closed position without having to manually retract the mouse platform 22. The mouse platform 22 may be self-retracted during closure of the keyboard drawer 20, as shown in FIG. 2.

During closure of the keyboard drawer 20, the arcuately shaped outer edge 72 of the mouse platform 22 makes contact with the vertical member adjacent the drawer which provides a pivot point, in this case, the end face 74 of desk leg 24, and rotates the platform 22 about screw fastener 64 to a retracted position, as the platform slides past desk leg 24. FIG. 3 shows the keyboard drawer 20 and mouse platform 22 in a fully retracted position, with the platform 22 overlying the keyboard drawer bottom 42.

FIG. 4 shows an alternate embodiment of the keyboard drawer 120 with self-retracting mouse platform 122 according to the present invention, where the mouse platform 122 is connected to the left sidewall 146 of the drawer 120. The mouse platform 122 is self-retracted during closure of the keyboard drawer 120 in this configuration by contact with a vertical member connected to the bottom of the desktop 126, in this case end face 174 of corner post 176 of drawer stack 128, causing the platform 122 to rotate about the screw fastener 164 to a retracted position, as the platform 122 slides past the stack of drawers 128.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A desk comprising:
    a desktop;
    a first vertical support member extending downward from said desktop;
    a sliding drawer mounted below said desktop and having one side adjacent said first vertical support member;
    a mouse platform pivotally connected to said one side of said drawer and extendable therefrom into a position in front of said vertical support member when said drawer is open, said mouse platform having a retracted position adjacent said vertical support member; and
    a platform stop connected to said mouse platform so as to limit the extension thereof when said mouse platform is pivoted in front of said vertical support member with said drawer open;
    wherein said mouse platform automatically pivots into said retracted position in response to contact with said vertical support member as said drawer is closed.

2. The desk of claim 1, wherein said drawer has a bottom and a sidewall connected thereto, said mouse platform pivotally connected atop said sidewall providing clearance for pivoting of said mouse platform above a keyboard resting on said bottom of said drawer.

3. The desk of claim 2, wherein said mouse platform has an arcuate outer edge.

4. The desk of claim 3, wherein said platform stop depends from a lower surface of said mouse platform and limits the extension thereof by contacting an inner surface of said drawer sidewall.

5. A desk comprising:
    a desktop;

a first vertical support member extending downward from said desktop;

a sliding drawer mounted below said desktop and having one side adjacent said first vertical support member;

a mouse platform pivotally connected to said one side of said drawer and extendable therefrom into a position in front of said vertical support member when said drawer is open, said mouse platform having a retracted position adjacent said vertical support member; and a platform stop depending from a lower surface of said mouse platform and limiting the extension thereof when said mouse platform is pivoted in front of said vertical support member with said drawer open;

wherein said mouse platform automatically pivots into said retracted position in response to contact with said vertical support member as said drawer is closed;

wherein said drawer has a bottom and a sidewall connected thereto, said mouse platform pivotally connected atop said sidewall providing clearance for pivoting of said mouse platform above a keyboard resting on said bottom of said drawer; and wherein said mouse platform has an arcuate outer edge.

6. The desk of claim 5, wherein said downwardly depending platform stop limits the extension of said mouse platform by contacting an inner surface of said drawer sidewall.

7. The desk of claim 5, wherein said platform stop also limits the retraction of said mouse platform when said drawer is closed.

8. A desk comprising:

a desktop;

first and second parallel vertical members extending downward from said desktop;

a keyboard drawer slidably engaged between said first and second vertical members, said keyboard drawer having a bottom, a sidewall positioned adjacent said first vertical member, and a hinge-mounted front wall having height greater than said sidewall relative to said bottom, providing a clearance pocket between said desktop and said sidewall;

a mouse platform pivotally connected horizontally atop said sidewall of said drawer within said clearance pocket, said mouse platform extendable into a position in front of one of said first and second parallel vertical members when said keyboard drawer is open and having a retracted position adjacent said vertical member; and a platform stop connected to said mouse platform so as to limit the extension thereof when said mouse platform is pivoted in front of said one vertical member with said drawer open;

wherein said mouse platform pivots into said retracted position in response to contact with said vertical support member as said keyboard drawer is closed.

9. The desk of claim 8, wherein said mouse platform has an arcuate outer edge.

10. A desk comprising:

a desktop;

first and second parallel vertical members extending downward from said desktop;

a keyboard drawer slidably engaged between said first and second vertical members, said keyboard drawer having a bottom, a sidewall positioned adjacent said first vertical member, and a hinge-mounted front wall having height greater than said sidewall relative to said bottom, providing a clearance pocket between said desktop and said sidewall;

a mouse platform pivotally connected horizontally atop said sidewall of said drawer within said clearance pocket, said mouse platform extendable into a position in front of one of said first and second parallel vertical members when said keyboard drawer is open and having a retracted position adjacent said vertical member; and a platform stop depending from a lower surface of said mouse platform and limiting the extension thereof when said mouse platform is pivoted in front of said one vertical member with said drawer open;

wherein said mouse platform pivots into said retracted position in response to contact with said vertical support member as said keyboard drawer is closed; and wherein said mouse platform has an arcuate outer edge.

11. The desk of claim 10, wherein said platform stop also limits the retraction of said mouse platform when said drawer is closed.

* * * * *